(12) United States Patent
Raynor

(10) Patent No.: US 8,462,139 B2
(45) Date of Patent: Jun. 11, 2013

(54) SOLID STATE IMAGE SENSOR SUITABLE FOR TOUCH SCREENS

(75) Inventor: Jeffrey Raynor, Edinburgh (GB)

(73) Assignee: STMicroelectronics (Research & Development) Ltd., Marlow, Buckinghamshire (GB)

( * ) Notice: Subject to any disclaimer, the term of this patent is extended or adjusted under 35 U.S.C. 154(b) by 297 days.

(21) Appl. No.: 13/072,960

(22) Filed: Mar. 28, 2011

(65) Prior Publication Data
US 2011/0234544 A1   Sep. 29, 2011

(30) Foreign Application Priority Data
Mar. 29, 2010   (GB) .................................. 1005249.6

(51) Int. Cl.
*G06F 3/042* (2006.01)

(52) U.S. Cl.
USPC ........... 345/175; 345/156; 345/173; 348/294; 348/308; 178/18.09; 178/19.05

(58) Field of Classification Search
USPC .................. 345/173–183; 348/241–257, 294, 348/308; 715/841; 178/18.09, 19.05
See application file for complete search history.

(56) References Cited

U.S. PATENT DOCUMENTS

| | | | | |
|---|---|---|---|---|
| 6,483,541 | B1 * | 11/2002 | Yonemoto et al. | 348/302 |
| 2008/0042888 | A1 * | 2/2008 | Danesh | 341/157 |
| 2008/0061217 | A1 * | 3/2008 | Burkatovsky | 250/214 A |
| 2008/0239124 | A1 * | 10/2008 | Mori et al. | 348/308 |
| 2009/0307633 | A1 * | 12/2009 | Haughay et al. | 715/841 |

FOREIGN PATENT DOCUMENTS

EP   1956715 A1   8/2008

OTHER PUBLICATIONS

United Kingdom Search Report for GB1005249.6 dated May 25, 2010 (3 pages).

* cited by examiner

*Primary Examiner* — Lun-Yi Lao
*Assistant Examiner* — Insa Sadio
(74) *Attorney, Agent, or Firm* — Gardere Wynne Sewell LLP

(57) ABSTRACT

Disclosed is a sensor apparatus comprising a plurality of pixels, a digital to analog converter for providing a ramp signal, A comparator for comparing the output level of each pixel to said ramp signal, and memory for storing the digital value that corresponds to said output level for each pixel, the sensor apparatus thereby converting the analog output level of each pixel to a digital value. The apparatus operates by providing an analog output that is sourced from the digital to analog converter used to provide said ramp signal.

20 Claims, 8 Drawing Sheets

SOLID STATE IMAGE SENSOR SUITABLE FOR TOUCH SCREENS

PRIORITY CLAIM

This application claims priority from United Kingdom Application for Patent No. 1005249.6 filed Mar. 29, 2010, the disclosure of which is hereby incorporated by reference.

TECHNICAL FIELD

This invention relates to solid state image sensors, and is particularly but not exclusively useful in image sensors for use in touch screen devices.

BACKGROUND

Touch/multi-touch systems are becoming popular, not just on mobile phones, but also in the PC environment. Both MS Windows (RTM) 7 and KDE 4.4 support multi-touch interfaces. There are various touch-screen technologies, such as resistive, capacitive and projected capacitive that are suitable for small screen devices. These technologies are difficult to scale up for larger screens that are found on PCs and optical systems are a more suitable choice.

Typically, these systems are mounted at two or more corners of a screen and have an LED to illuminate either the finger or retro-reflective screens, and a sensor to observe the image. From the image, it is possible to calculate the position of the finger. For (X,Y) co-ordinate output, at least two sensors are required.

As these sensors are placed inside the bezel of a LCD/LED/plasma or similar screen, they must be connected to a controller (processing means) via a long cable (up to 0.5 m on a 20" (51 cm screen). To maintain EMC (electro-magnetic compatibility), the RF (radio frequency) emissions from this cable should be kept to a minimum. Cost restrictions prevent the use of expensive, shielded multi-core cables and communication methods such as LVDS (low voltage differential signaling), where 4 conductors are used—one pair for clock and another for data.

The solution currently employed is to use an analog output from the sensor device. This requires only one conductor to carry the data. Also, due to the relatively low spatial content in the image, there is no high frequency voltage swings in the output, making processing easier. Although this technique works well, existing sensor technologies are therefore analog throughout the data path—from pixel through to output. This has several disadvantages: A long thin sensor has a lot of stray capacitance on the output bus, which makes signal degradation difficult to avoid; It requires the use of analog multiplexers which are susceptible to signal degradation such as rise and fall time limitations, cross-talk from neighboring pixels, noise coupling from the rest of the circuitry etc.; It is difficult or expensive to provide on-chip signal processing, for example: Companding of data for better dynamic range, e.g. gamma correction, logarithmic compression or similar, Subtraction of ambient light levels, Defect correction, Thresholding, Image compression.

There is a need in the art to address one or more of the above issues.

SUMMARY

In a first aspect there is provided a sensor apparatus comprising: a plurality of pixels, a digital to analog converter for providing a ramp signal, comparison means for comparing the output level of each pixel to said ramp signal, and storage means for storing the digital value that corresponds to said output level for each pixel, said sensor apparatus thereby converting the analog output level of each pixel to a digital value, wherein said sensor is operable to provide an analog output, said analog output being sourced from said digital to analog converter used to provide said ramp signal.

Said sensor apparatus may comprise one comparator for each column for performing said comparison of said output level to said ramp signal output from said digital to analog converter.

Said sensor apparatus may further comprise a first memory for storing said digital value corresponding to an active pixel output level and a second memory for storing a digital value corresponding to an ambient pixel output level. Said memories may be physically located on the sensor chip. In particular they may be physically located within the column readout architecture of said sensor. Said memories may comprise SRAM.

Said sensor apparatus may comprise a multiplexer for connecting the digital to analog controller output to the sensor output or to provide the ramp signal as appropriate.

Said sensor apparatus may be operable to store any digital value as a Gray encoded value. Said sensor apparatus may comprise two counter busses, one bus for counting in binary, the other bus for counting in Gray codes. Alternatively, there may be provided a single counter bus and conversion means to convert the Gray codes into binary prior to analog conversion.

In other aspects of the invention there is provided a touch screen and a multi-touch screen incorporating one or more of the sensor apparatus as disclosed herein. There is also provided computer apparatus comprising such a touch screen or multi-touch screen.

In a further aspect of the invention there is provided a sensor apparatus comprising a plurality of pixels, the analog output level of each pixel being converted to a digital value, wherein said sensor is further operable to provide an analog output corresponding to said digital values.

BRIEF DESCRIPTION OF THE DRAWINGS

Embodiments of the invention will now be described, by way of example only, by reference to the accompanying drawings, in which.

DETAILED DESCRIPTION OF THE DRAWINGS

Existing sensors for touch-screen applications typically operate by acquiring two images, one with an IR LED/laser/VCSEL (vertical cavity surface emitting laser) on and one with the IR LED/laser/VCSEL off. By subtracting these two images, the ambient light level can be eliminated.

If this is performed on the sensor, then the sensor needs to store one complete image. This is difficult and expensive to perform in the analog domain as it requires the use of large storage capacitors to overcome the problem of "kTC" noise. "kTC" noise results from there being uncertainty on the voltage of the capacitor Vnoise, this uncertainty equaling SQRT (kT/C), where k is Boltzmann's constant, T is absolute temperature and C is the capacitance.

If this is performed off the sensor, then the sensor needs to output both images, doubling the bandwidth requirements and also the ADC sampling rate of the receiving device.

Most CMOS image sensors (DSC, mobile phone cameras etc.) have a digital output and most of the internal communication is in the digital domain. A sensor with a digital data path can avoid the issues of signal degradation on-chip and also provide processing. The disadvantage of digital output is extra wires for communication (typically 4) and associated bond-pads. Such image sensors may comprise a number of different arrangements, with regard to obtaining the digital output. For example, a sensor may comprise a single analog to digital converter (ADC) on the output, or a number of ADCs, for example one per column or where high speed conversion is required, one per pixel.

Figure 1:
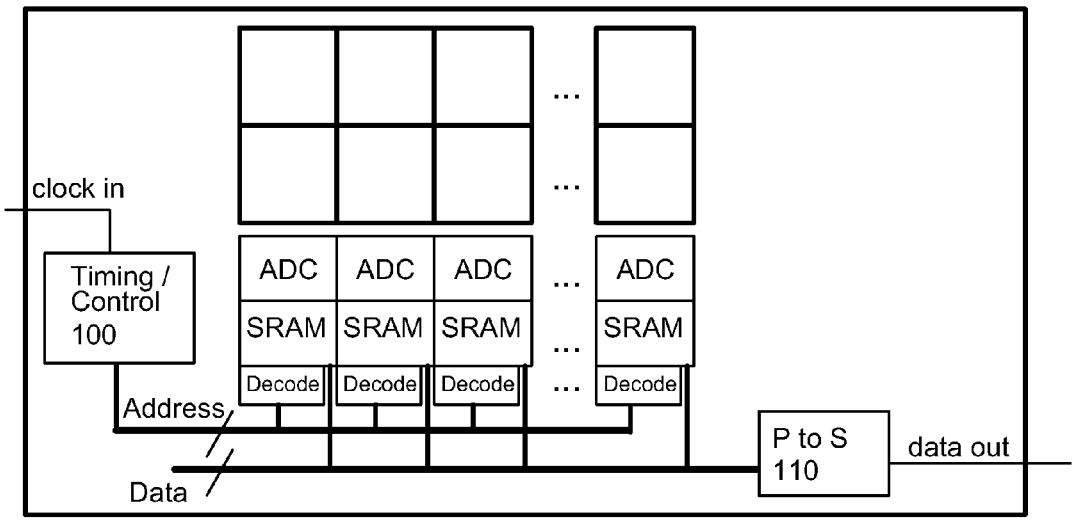
FIG. 1 shows a sensor with an ADC per column and serial output.

FIG. 1 shows a known way of obtaining many of the advantages of on-chip digital processing, but with a reduction in the output wiring. It shows a sensor with an analog to digital convertor ADC and associated memory SRAM for every column, but where the output from each ADC is multiplexed onto a serial output by parallel to serial converter 110. This has its own drawbacks, however, requiring more complex timing/control 100 and having a slow output.

The arrangement of FIG. 1 may employ various types of ADC for each column: SAR (successive approximation register) type; sigma-delta ADC; column-parallel comparator ADC.

Figure 2:
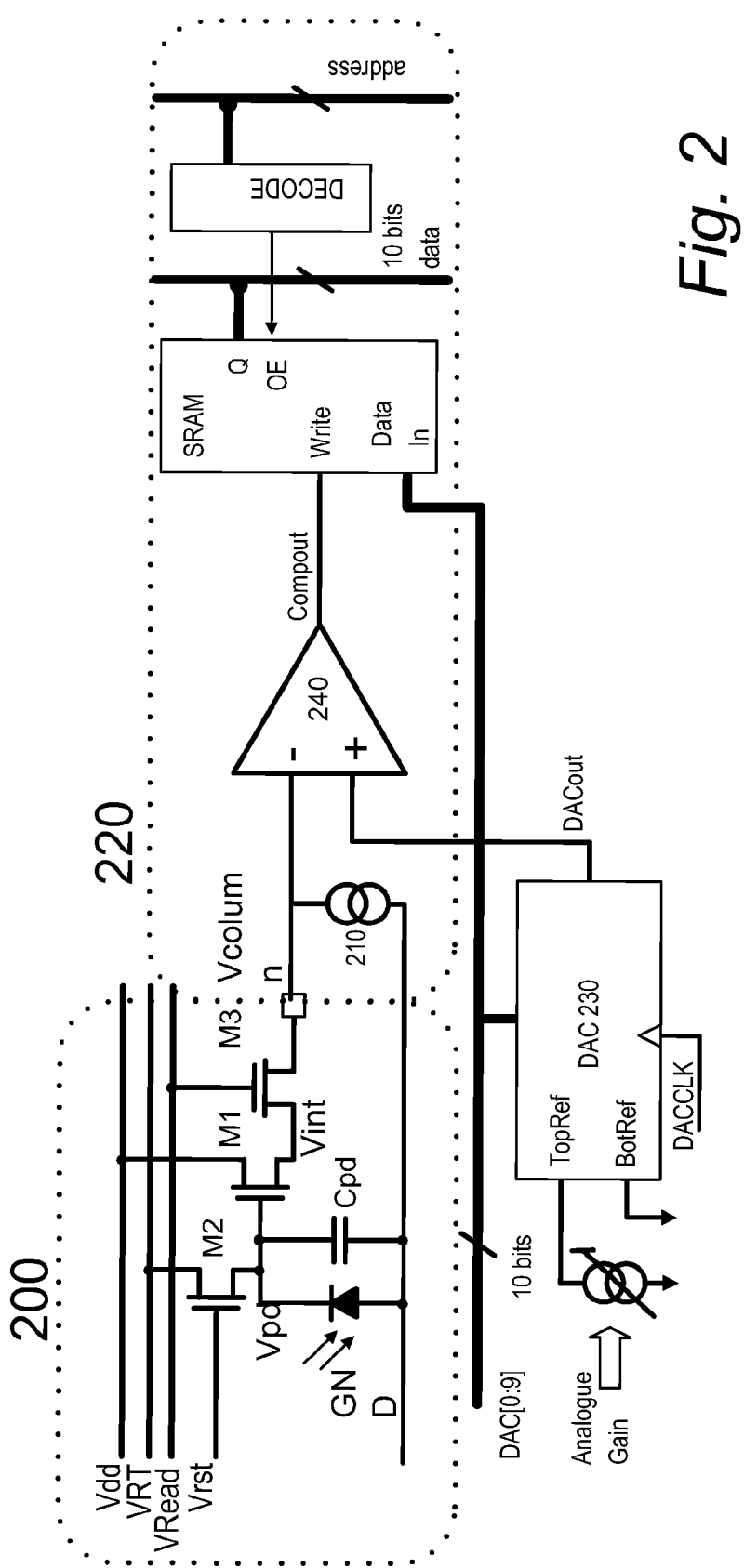
FIG. 2 shows a sensor with column parallel architecture.

FIG. 2 shows a sensor with a column parallel ADC architecture. This example shows a 3 transistor (3T) pixel 200, but the principle is the same for other pixel types, e.g. passive pixels, 1.5T, 1.75T, 2.5T, 4T. Also, a simple current load 210 in the column 220 is shown, however in practice this is likely to be a sophisticated sample/hold circuit, often employing clamping circuitry to prevent excessive voltage excursion. The column may also use a CTA (continuous time architecture) type of comparator to both remove offsets and reset (kTC) noise. This is described in European Application for Patent 07101955.8 (published as EP 1,956,715), the disclosure of which is incorporated herein by reference.

In this arrangement there is a single digital to analog converter (DAC) 230 per sensor and this is used to generate a ramp voltage. The voltage levels from one row of pixels are read out on their respective column comparators 240 and each voltage is compared with the ramp voltage. When the two voltages are the same, the memory SRAM in the column stores the value "DAC[0:9]". As the voltages on the DAC 230 and the column 220 are the same, the digital value DAC[0:9] is therefore the digitized value of the analog voltage. This value (stored in the column) SRAM is subsequently read out onto a digital bus when required.

Note that due to the asynchronous (to the DAC clock, DACCLK) nature of the voltage from the pixel 200, there may be a "race condition". This is when the DAC[0:9] value changes and one bit e.g. DAC[9] changes before the rest of the bits. This would lead to significant errors in the value stored in the SRAM. Hence, it is common to use a Gray-code for the data on the SRAM and binary code for the DAC 230. There are many ways of achieving this, such as by using Gray-binary and binary-Gray converters or by using two separate, but synchronized counters, one for binary and one for Gray. Examples of both of these methods are illustrated below with reference to FIGS. 3 and 4.

Figure 3:
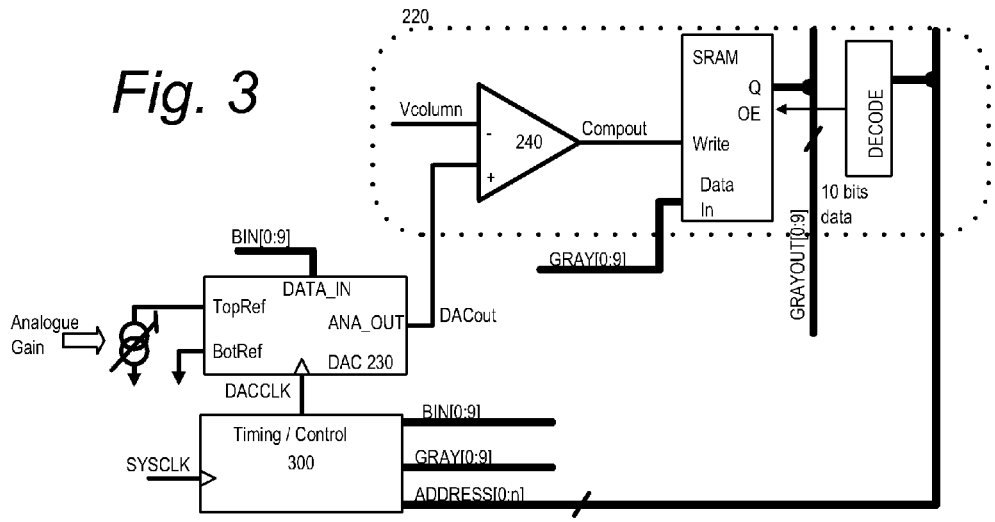
FIG. 3 shows the sensor of FIG. 2 with Gray encoding according to a first arrangement.

FIG. 3 is essentially the same arrangement as FIG. 2 except that for clarity, the pixel is omitted, and that two counter busses BIN, GRAY are used. A binary counter BIN for the DAC 230 and a Gray encoded counter GRAY are included to avoid race conditions on the data for the SRAM.

Figure 4:
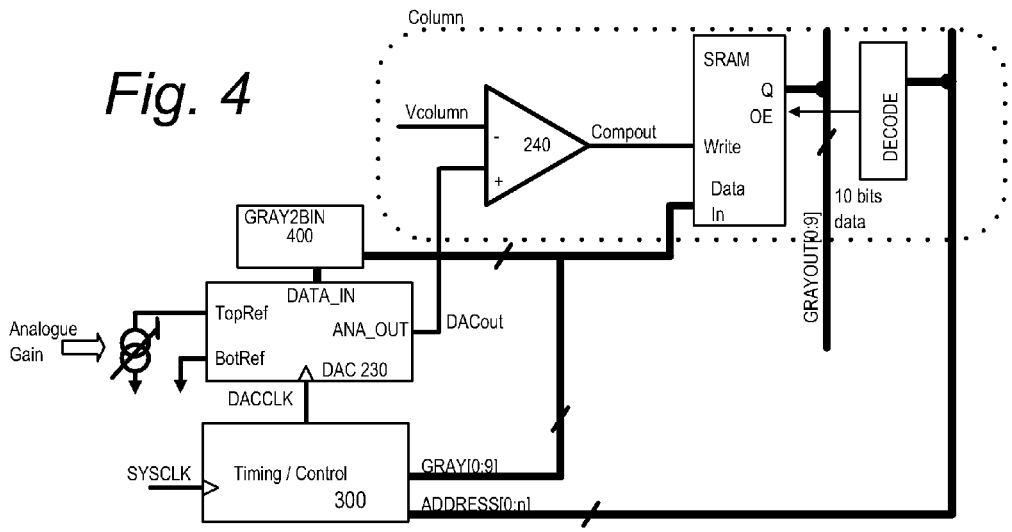
FIG. 4 shows the sensor of FIG. 2 with Gray encoding according to a second arrangement.

FIG. 4 is similar to FIG. 3, except that instead of the "timing/control" block generating two busses BIN, GRAY, the "timing/control" block generates only one bus (GRAY) and this is converted into binary by a simple block 400 at the input data path of the DAC.

In both FIG. 3 and FIG. 4, the output from the column SRAM is Gray encoded data. If required, this data could be turned back into binary using a gray to binary block. Typically the binary data is output from the sensor, either in serial or parallel form.

Figure 5:
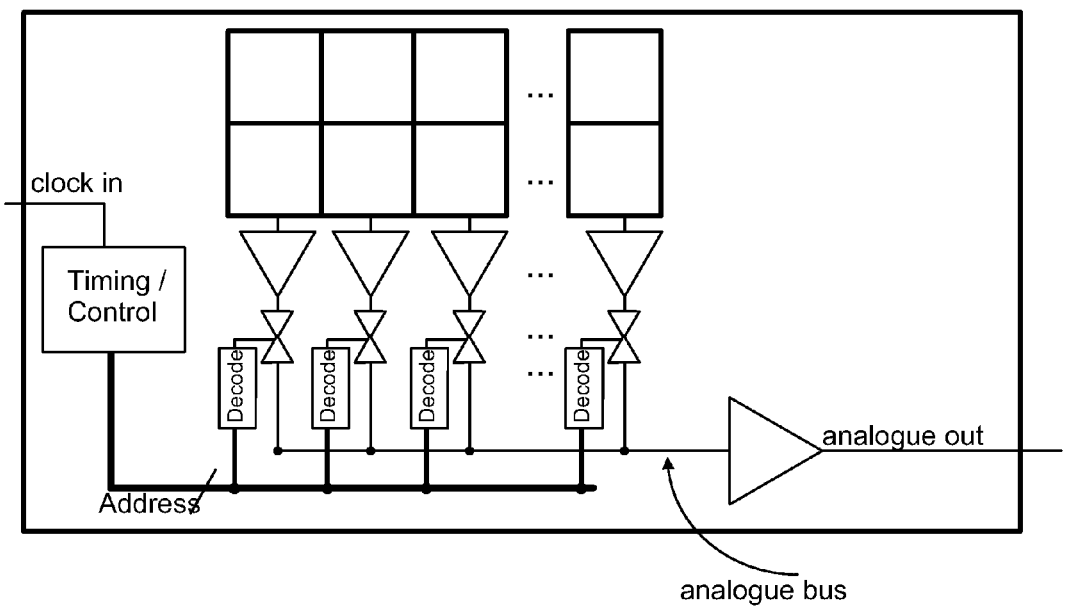
FIG. 5 shows a sensor with analog path and analog output.

As said previously, in many applications it is preferable to have an analog output, particularly where the additional wiring is a significant issue. One possible solution to this problem is to employ a hybrid analog-digital device. The data from the pixel is converted into digital, processed but then output as an analog signal. FIG. 5 shows a known example of such a device.

Figure 6:
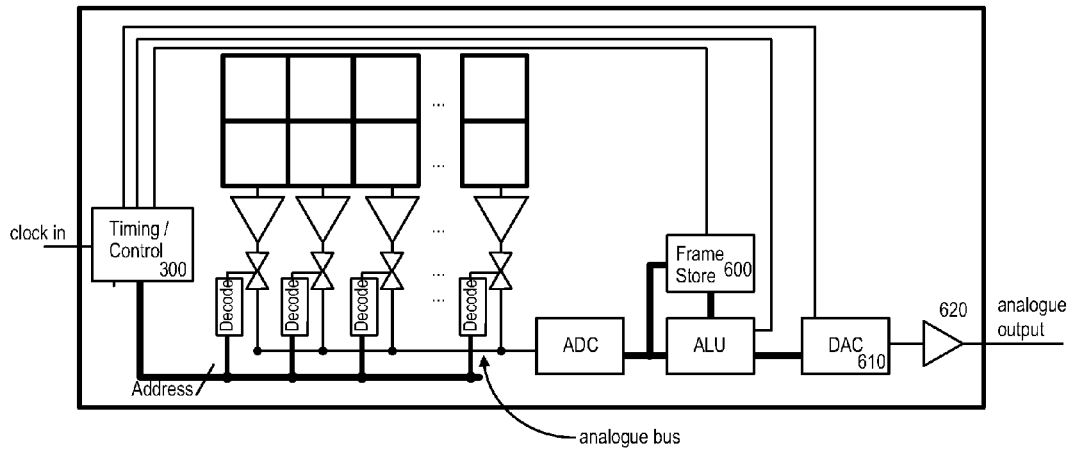
FIG. 6 shows a first hybrid analog-digital-analog sensor.

FIG. 6 shows a solution to the problem of obtaining the benefits of digital processing and the advantages of analog communication with minimal re-design of the existing architecture. It shows the addition of a frame store 600 (to allow the subtraction of the ambient light levels) and an arithmetic logic unit ALU to the basic architecture of FIG. 5. This unit may be a simple subtraction circuit, or it may include techniques for compressing and/or companding the data stream.

The output from the ALU is then turned into an analog waveform using the DAC 610 and output from the device, preferably using an output buffer 620. Typically, the bit-width of the DAC 610 is the same as the bit-width of the ADC's used. Conventionally, adding or subtracting two digital integers results in an answer which is one bit larger (e.g. 11b+11b=110b). However in the case of image sensors where subtraction is performed, it is known that one signal is larger than another and therefore the sign bit is not required. Hence the subtraction of two (e.g.) 10 bit (unsigned) integers will result in the output of a 10 bit (unsigned) integer. As the inputs are from an ADC, the presence of (analog) noise at the ADC's input will affect the output of the ADC. Hence, if the pixel is very dark, it is possible that the exposed signal (e.g. 3) is lower than the non-exposed signal (e.g. 4) so performing a simple subtraction (e.g. 3−4) would result in a negative value (e.g. −1). Hence it is standard to always add an offset (e.g. 8) to avoid this situation (e.g. if "black"=3 and "exposed"=4, then output=3−4+8=7). This avoids the problem of negative numbers, sign bits at the cost of a small reduction in the dynamic range.

Unfortunately, the arrangement of FIG. 6 also suffers from quite a few of the disadvantages of having an analog architecture: there is a lot of stray capacitance on the output bus, which makes signal degradation difficult to avoid; It requires the use of analog multiplexers which are susceptible to signal degradation such as rise and fall time limitations, cross-talk from neighboring pixels, noise coupling from the rest of the circuitry etc.

Figure 7:
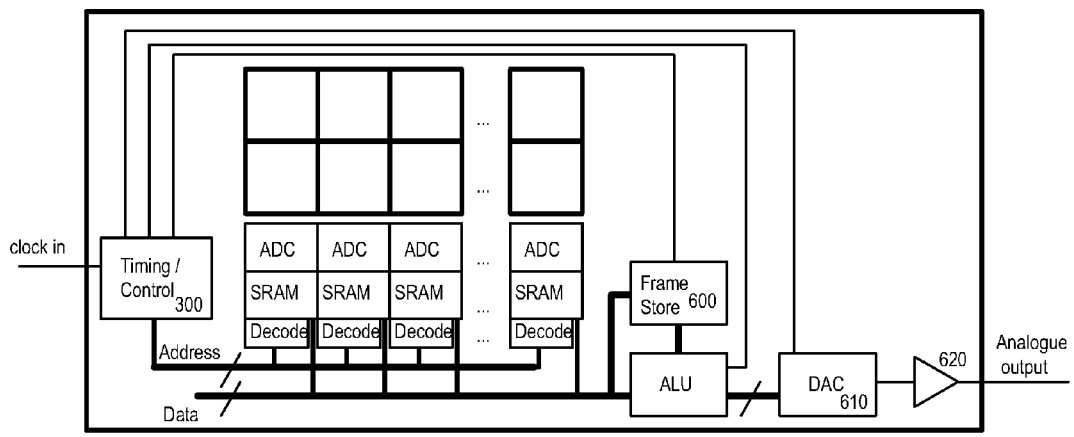
FIG. 7 shows a second hybrid analog-digital-analog sensor.

FIG. 7 shows an improvement to the arrangement of FIG. 6, where the signal is digitized as soon as possible, hence avoiding all the analog design issues mentioned above. FIG. 7 also has the advantage of a single, (low-frequency/low EMI) analog output.

The digital processing using frame store and ALU is similar to that described for FIG. 6. The problem with this arrangement is that it requires the addition of a digital-analog converter 610. Typically this will have the same bit-depth and accuracy as the ADCs. Unlike the ADCs which are shared among the columns, the DAC is common to the output and so is a "bottleneck" in system performance. Hence this arrangement requires a high performance, high-speed DAC 610 which is requires a large amount of silicon to implement, greatly adding to the cost of the device. Furthermore, the DAC 610 consumes additional power. This could be mitigated by turning it off when not in use, but turning on/off increases the variation in the current consumption of the device, thereby making the design and implementation of the device's power supply more complex.

Figure 8:
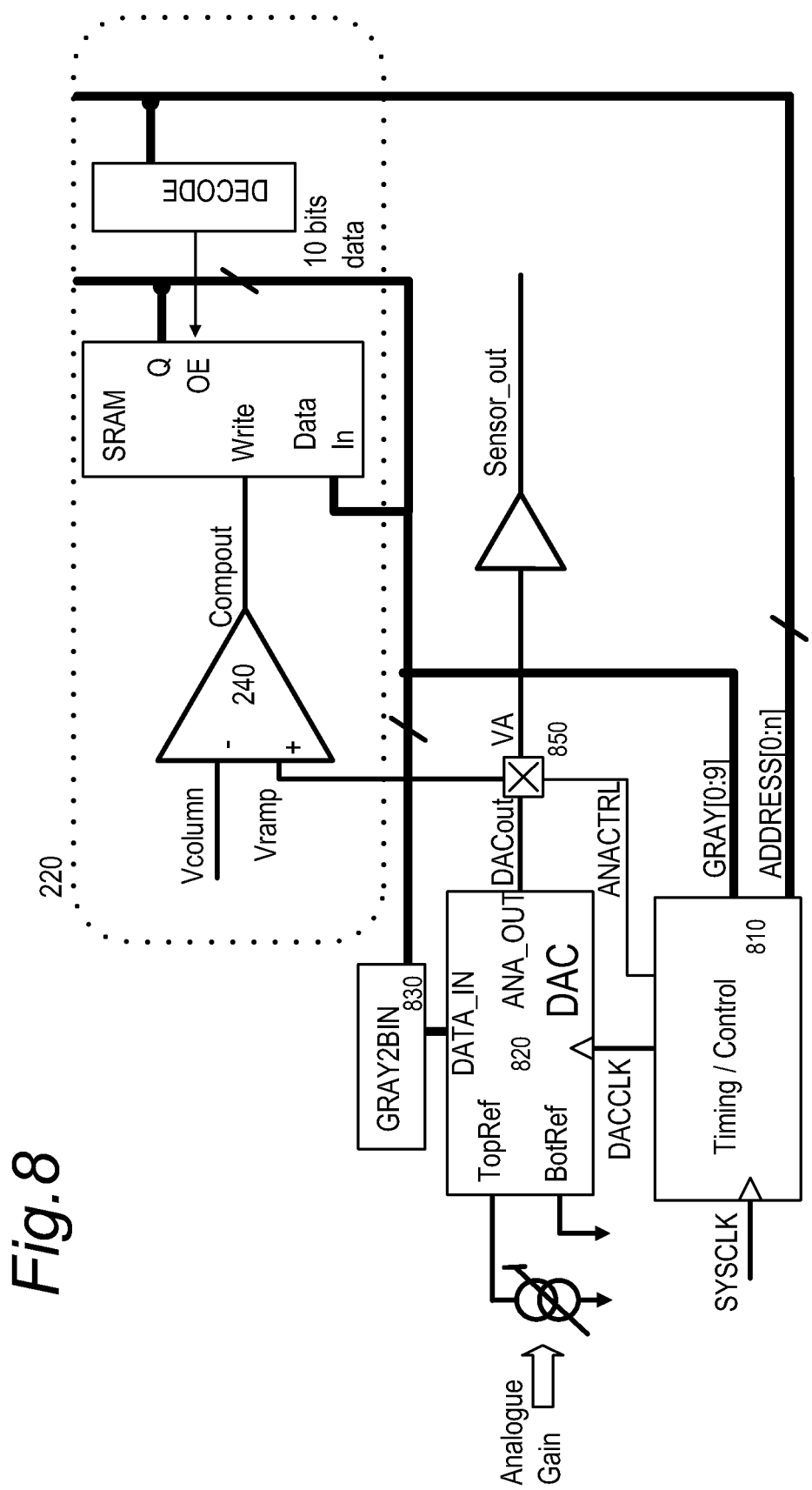
FIG. 8 shows a sensor circuit according to a first embodiment of the invention.

FIG. 8 shows a first embodiment which addresses this issue by using a column parallel-architecture ADC as shown in FIG. 4, but also re-uses the DAC 820 for the output signal. The output from the column memory SRAM is fed back into the DAC 820 (via the binary encoder 830 as it is gray-encoded) and the DAC 820 outputs the pixel's value in analog form. Note that when the "timing/control" block 810 requires the column's gray SRAM data, it puts the appropriate signals on the address bus "ADDRESS[0:n]" and disables (e.g. tri-states) the output GRAY[0:9]. Typically, the "timing/control" block 810 will scan through all the column memory SRAM, but it is practical to scan through a sub-set to get a "region of interest" of the image scene.

The signal "ANACTRL" is used to control whether the output from the DAC is used to connect to the comparator ("Vramp") or to the device's output. The selection is optionally performed by an analog multiplexer 850. Alternatively, it is possible to disable the analog output buffer when the system is in pixel ADC mode and enable the analog output buffer when the system is scanning the memory SRAM and wishes to output data.

While FIG. 8 shows an architecture based on the arrangement of FIG. 4, it could equally have been based on the arrangements of FIG. 2 (without Gray counter) or FIG. 3 (two counter busses).

Figure 9:
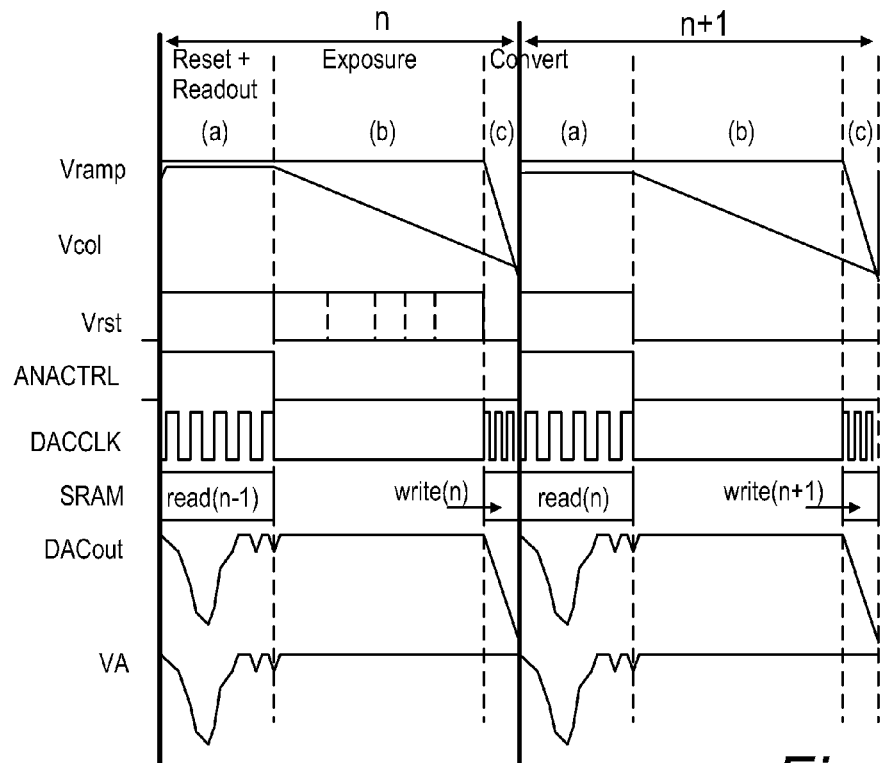
FIG. 9 shows a timing diagram for the operation of the circuit of FIG. 8.

FIG. 9 shows the timing diagram for the basic form of the invention. There are 3 phases: (a) Reset+Readout; (b) Exposure (c) A-D Conversion. Signals shown are the column output—Vcol, the ramp signal from the DAC—Vramp, The Pixel reset signal (see FIG. 2)—Vrst, multiplexer control signal—ANACTRL, DAC clock—DACCLK, memory control signal—SRAM, DAC output—DACout and sensor output—VA.

During phase (a), the data from the previous line (or frame in the case of a linear sensor) is read out from the SRAM and into the DAC which produces the analog output signal. ANACTRL is high so the DACout signal is connected to the device's output buffer, as seen by signal VA.

During phase (b) the pixel is exposed to light, hence Vcol falls. Typically, the pixel is held in reset for a variable length of time to perform electronic exposure control—the longer the pixel is in reset the less sensitive it is to light. Alternately; for use in touch screen applications, the pulse width of the LED is modulated to control the illumination and hence prevent the pixel from saturating.

During phase (c) The DAC output signal DACout is connected to the comparator signal input, to provide the ramp signal Vramp. The BIN/GREY values are stepped; the DAC "ramps" and, when Vramp equals Vcol, the analog voltage output from the pixel is converted to a digital value and stored in the column's SRAM. The ANACTRL signal is low so the ramp does not appear on the sensor output VA. Instead signal VA is held at a constant voltage (e.g. using a sample/hold circuit) or optionally pre-set voltage.

Typically, the clock frequency of signal DACCLK during phase (a) is lower than during (c). This is so that the driver can drive the long connection to the main control system for the touch-screen interface and also because the ADC at the touch-screen interface controller has a lower-speed than the ADC that operates on the sensor device.

The basic embodiment allows an analog output from the device. As there is no digital processing, there is not much benefit to this. However, the concept can be extended in the digital domain so that extra functionality can be easily incorporated in the device, i.e. the functionality shown in FIG. 6 or FIG. 7 can be included.

Figure 10:
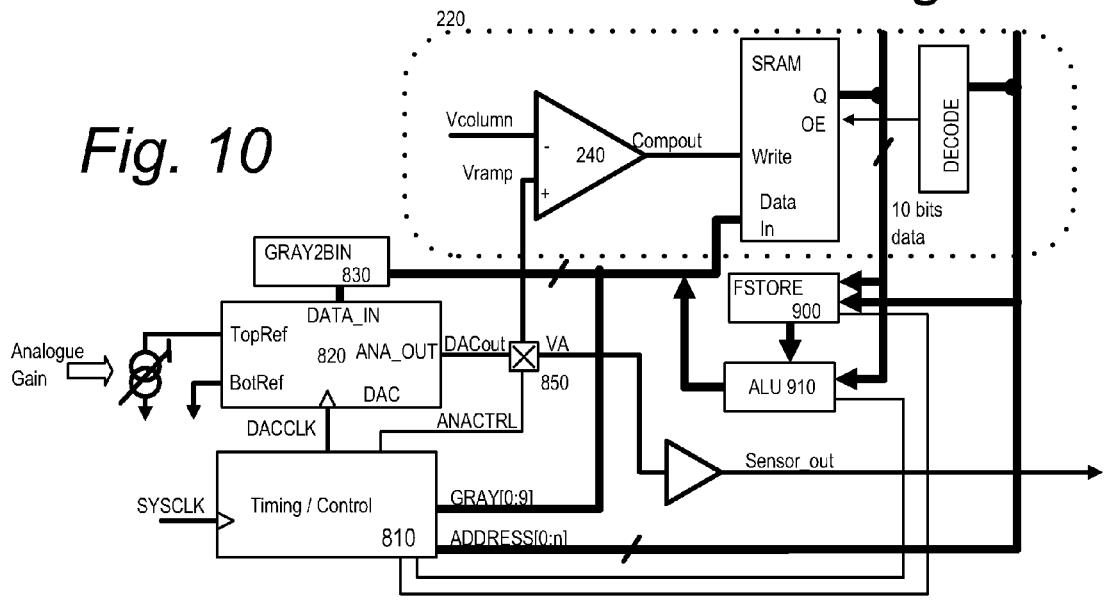
FIG. 10 shows a sensor circuit according to a second embodiment of the invention.

FIG. 10 shows an embodiment enhanced in a similar manner to FIG. 6 by the addition of a frame store 900 and arithmetic/logic unit 910. In this embodiment the frame store 900 is shown external to the columns 220. Having a frame store allows the capture and storage of an image (e.g. in a linear sensor) or sub-image (e.g. in 1 line of a 2D sensor).

Figure 11:
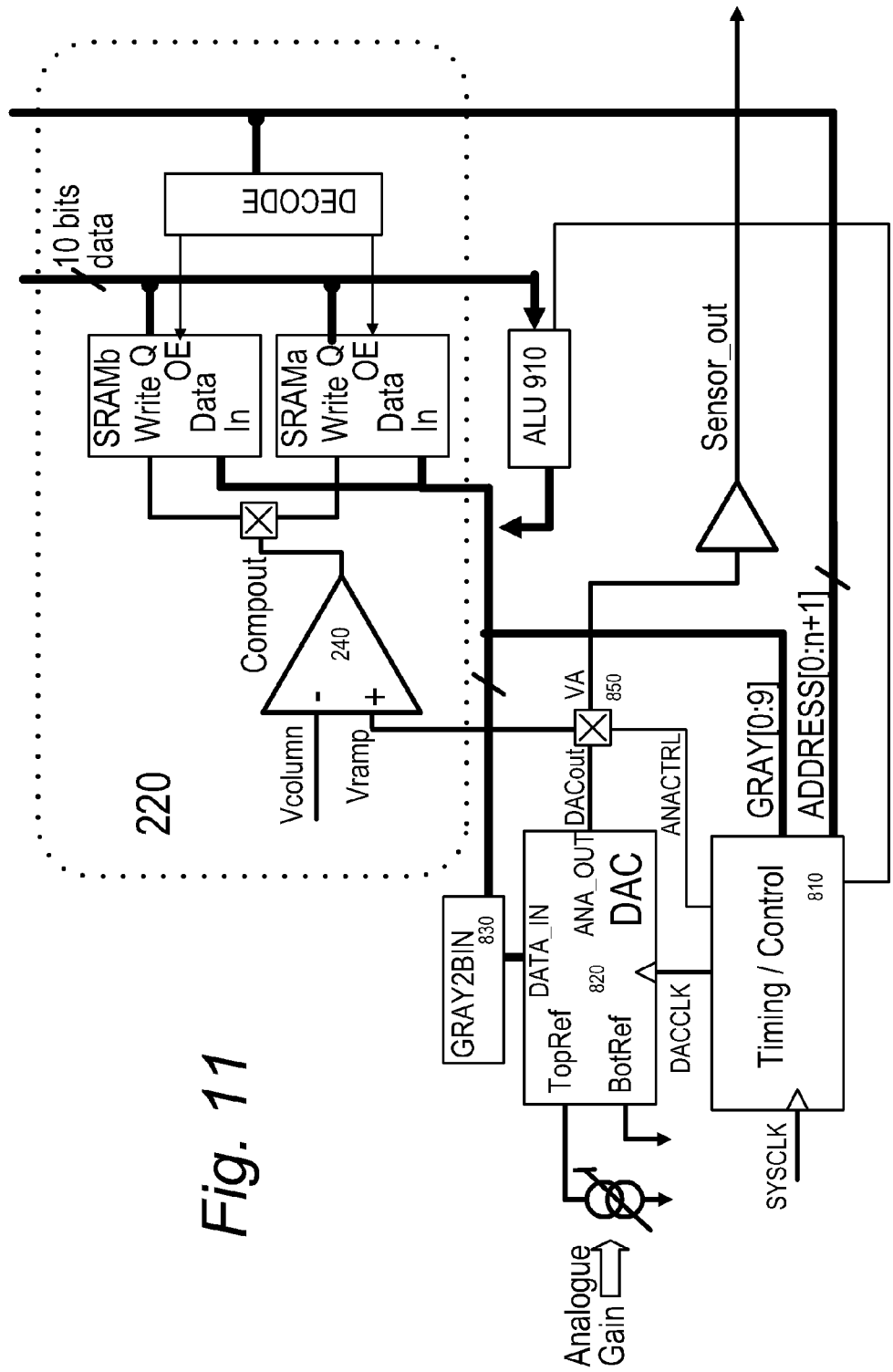
FIG. 11 shows a sensor circuit according to a third embodiment of the invention.

Depending on the pixel pitch, it may be practical to include the additional frame store inside the column. This technique saves considerable space. FIG. 11 shows such an enhancement in which the pixel has an in-column frame store consisting of 2 memory blocks, SRAMa and SRAMb.

Figure 12:
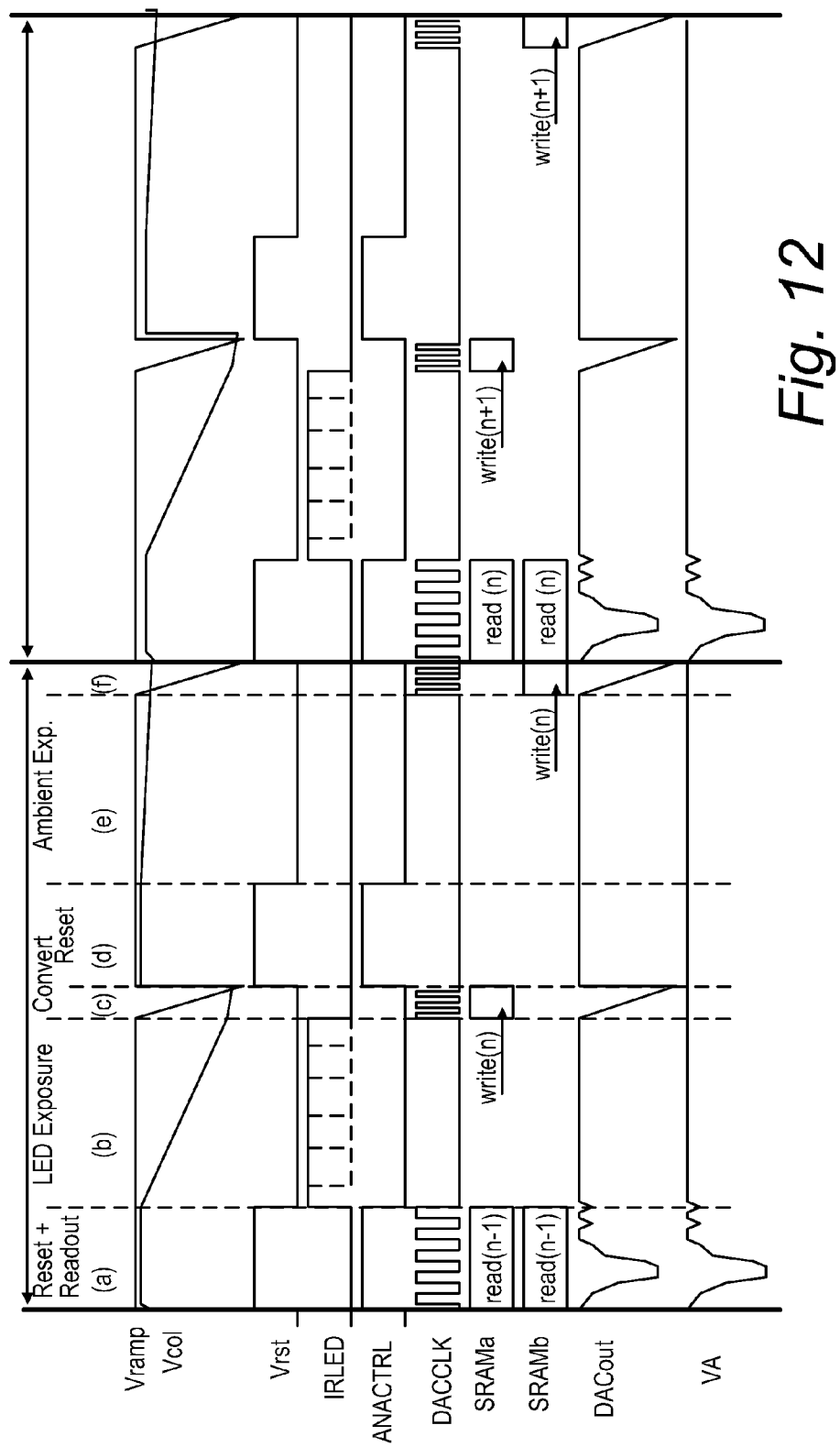
FIG. 12 shows a timing diagram for the operation of the circuit of FIG. 11.

FIG. 12 shows a timing diagram for ambient light cancellation using the in-column frame store of FIG. 11 where each column has two SRAM stores. This eliminates the need for a frame store outside the pixel/readout area and is therefore particularly space efficient.

The operation is similar to that of FIG. 8, except the basic structure is duplicated, once with the LED on and once off. There are six phases: (a) Reset+Readout; (b) LED Exposure (c) AD Conversion (LED+ambient); (d) Reset; (e) Ambient exposure; (f) ADC conversion (ambient). The signals shown are the column output—Vcol, the ramp signal from the DAC—Vramp, The Pixel reset signal (see FIG. 2)—Vrst, Led control signal—IRLED, multiplexer control signal—ANACTRL, DAC clock—DACCLK, memory control signals—SRAMa amd SRAMb, DAC output—DACout and sensor output—VA.

During phase (a), the data from the previous line (or frame in the case of a linear sensor) is read out from the SRAMs. Typically, SRAMa and SRAMb are read out sequentially and passed to an ALU which calculates the difference signal (or applies compression, companding etc.). If required, the ALU output is binary-to-gray encoded to counteract the ADC's gray-to-binary encoder. Alternately, the ALU output data is passed (typically via a multiplexer, not shown) to the DAC.

The DAC produces an analog output signal. ANACTRL is high so the DACout signal is connected to the device's output buffer as seen by signal VA. The pixels are kept in reset.

During phase (b) the pixel is exposed to light, a combination of LED (IRLED is high) and ambient. Typically, the pixel is held in reset for a fixed length of time. Electronic exposure control is typically performed by pulse width modulation of the LED to prevent the pixel from saturating.

During phase (c) The DAC output signal DACout is connected to the comparator signal input, to provide the ramp signal Vramp. The BIN/GREY values are stepped; the DAC "ramps" and the analog voltage output from the pixel is converted to a digital value and stored in the column's SRAMa. The ANACTRL signal is low so that the ramp does not appear on the sensor output. Instead VA is held at a constant voltage (e.g. using a sample/hold circuit) or optionally a pre-set voltage.

During phase (d), the pixels are kept in reset. FIG. 12 shows phase (d) being the same time as phase (a). However, as nothing else is happening (i.e. unlike phase (a) there is no data being read out), it is possible to shorten this phase.

During phase (e) the pixel is exposed to light. However, unlike in phase (b); the LED is now turned off and only ambient illumination is on the pixel. As there are fewer photons impinging on the photodetection area, the photodiode voltage, and therefore signal Vcol, will decay more slowly.

During phase (f) The DAC output signal DACout is again connected to the comparator signal input, to provide the ramp signal Vramp. The BIN/GREY values are stepped; the DAC "ramps" and the analog voltage output from the pixel is converted to a digital value and stored in the column's SRAMb. The ANACTRL signal is held low so that the ramp does not appear on the sensor output. Again VA is held at a constant voltage (e.g. using a sample/hold circuit) or optionally pre-set voltage.

This cycle repeats. The data output during phase (a) of cycle "n" is that recorded during phases (c) and (f) of cycle "n−1".

The above examples are provided for illustration only and other embodiments and variations can be envisaged without departing from the spirit and scope of the invention.

What is claimed is:

1. Apparatus, comprising:
   a pixel,
   a digital to analog converter configured to provide a ramp signal,
   at least one comparator configured to compare an analog output level of the pixel to said ramp signal and thereby convert the analog output level of the pixel to a corresponding digital value, and
   at least one memory configured to store the digital value that corresponds to said output level for the pixel,
   wherein said digital to analog converter is further operable to convert the digital value stored in the memory to provide an analog pixel output representative of the analog output level of the pixel.

2. The apparatus as claimed in claim 1 wherein said at least one comparator comprises one comparator for each column of pixels.

3. The apparatus as claimed in claim 1 wherein said at least one memory comprises a first memory configured to store the digital value corresponding to the analog output level of the pixel and a second memory configured to store another digital value corresponding to an ambient pixel output level.

4. The apparatus as claimed in claim 3 wherein said first and second memories are physically located on a sensor chip including said pixel.

5. The apparatus as claimed in claim 3 wherein said first and second memories are physically located within a column readout architecture of a sensor including said pixel.

6. The apparatus as claimed in claim 3 wherein said first and second memories comprise SRAM.

7. The apparatus as claimed in claim 1 further comprising a multiplexer configured to connect the digital to analog converter output to a sensor output to provide the analog pixel output in a first mode and configured to connect the digital to analog converter output to the comparator in a second mode to provide said ramp.

8. The apparatus as claimed in claim 1 being operable to store any digital value as a Gray encoded value.

9. The apparatus as claimed in claim 8 comprising two counter busses, one bus for counting in binary, and another bus for counting in Gray codes.

10. The apparatus as claimed in claim 8 further comprising a conversion circuit configured to convert Gray codes into binary prior to analog conversion.

11. The apparatus as claimed in claim 1 comprising a plurality of pixels, the analog output level of each pixel being converted to a digital value, and an analog output is provided corresponding to said digital values.

12. The apparatus of claim 1 wherein the apparatus comprises a touch screen incorporating one or more of said sensors.

13. The apparatus of claim 1 wherein the apparatus comprises a touch screen incorporating said sensor and being operable to detect more than one simultaneous touch.

14. The apparatus of claim 1 wherein the apparatus comprises a computer apparatus incorporating said sensor and being operable as a touch screen.

15. The apparatus of claim 1 wherein the apparatus comprises a portable computer incorporating said sensor and being operable as a touch screen.

16. Apparatus, comprising:
   a pixel operable to generate an analog output level,
   a digital to analog converter operable in a first mode to provide a ramp signal,
   a comparison circuit configured to compare the analog output level of each pixel to said ramp signal provided by said digital to analog converter when operating in the first and generate a digital output level corresponding to said analog output level, and
   a memory configured to store the digital output level,
   wherein said digital to analog converter is further operable in a second mode to receive the digital output level from the memory and convert the received digital output level to an analog pixel output signal representative of the analog output level of the pixel.

17. The apparatus of claim 16 further comprising timing control circuitry operable to control selection of the first mode and second mode for the digital to analog converter.

18. The apparatus of claim 16 further comprising a multiplexer having an input coupled to an output of the analog to digital converter, said multiplexer having a first output active in the first mode and coupled to an input of the comparison circuit to provide the ramp signal, said multiplexer further having a second output active in the second mode and coupled to a sensor output to provide the analog pixel output signal.

19. A method, comprising: generating an analog output level from a pixel; using a digital to analog converter in a first mode to provide an analog ramp signal; comparing the analog output level to said ramp signal; producing, from the comparison of the analog output level to said ramp signal, a digital output level corresponding to said analog output level; storing the digital output level in a memory; and using said digital to analog converter in a second mode to convert the stored digital output level to an analog pixel output signal representative of the analog output level of the pixel.

20. The method of claim 19, further comprising multiplexing an output of the digital to analog converter to provide the ramp signal to a comparator in the first mode and provide the analog pixel output signal to an output circuit in the second mode.

\* \* \* \* \*